United States Patent [19]
Edlund et al.

[11] 4,426,731
[45] Jan. 17, 1984

[54] CHARACTER RECOGNITION EMPLOYING COMPRESSED IMAGE DATA

[75] Inventors: Olof A. Edlund; Mats A. Enser, both of Lidingo, Sweden

[73] Assignee: International Business Machines Corporation, Armonk, N.Y.

[21] Appl. No.: 312,192

[22] Filed: Oct. 16, 1981

[30] Foreign Application Priority Data

Oct. 21, 1980 [SE] Sweden ................................ 8007369

[51] Int. Cl.³ .............................................. G06K 9/36
[52] U.S. Cl. ..................................... 382/56; 358/261; 382/48
[58] Field of Search ............................ 382/56, 48, 41; 358/261

[56] References Cited

U.S. PATENT DOCUMENTS

| | | | |
|---|---|---|---|
| 3,482,210 | 12/1969 | Lozier et al. | 382/18 |
| 3,502,806 | 3/1970 | Townsend | 358/261 |
| 3,604,840 | 9/1971 | Sharp | 358/78 |
| 3,699,536 | 10/1972 | Roberts | 382/56 |
| 3,912,943 | 10/1975 | Wilson | 358/280 |
| 4,001,787 | 1/1977 | Kimmel | 382/10 |
| 4,079,458 | 3/1978 | Rider et al. | 364/900 |
| 4,107,648 | 8/1978 | Frank | 382/56 |
| 4,145,686 | 3/1979 | McMurray et al. | 340/347 DD |

FOREIGN PATENT DOCUMENTS

| | | |
|---|---|---|
| 1951681 | 4/1969 | Fed. Rep. of Germany. |
| 1524390 | 3/1970 | Fed. Rep. of Germany. |
| 2731955 | 2/1978 | Fed. Rep. of Germany. |

OTHER PUBLICATIONS

P. J. Min and B. E. Nolan, Character Recognition Employing Fourier Transformation Based on Run-Length Coded Data Format, IBM TDB vol. 15, No. 12, May 1973, pp. 3873-3878.

P. J. Min and B. E. Nolan, Flagged Run-Length Coded Data Format, IBM TDB vol. 15, No. 12, May 1973, pp. 3849-3850.

R. L. J. Foster and P. D. Wright, High Speed Algorithm for Image Decompression/Compression, IBM TDB vol. 21, No. 1, Jun. 1978, pp. 367-376.

M. K. Bush and J. E. R. Young, Display of Stored Images, IBM TDB vol. 18, No. 1,Jun. 1975, pp. 272-273.

Primary Examiner—Howard W. Britton
Attorney, Agent, or Firm—E. Ronald Coffman

[57] ABSTRACT

An optical character recognition system stores image data as a compressed run-length code. Preprocessing of characters for segmentation and registration is performed on the compressed data by means of tables created by a microprocessor. Only the image data required for recognition is expanded for the recognition process.

9 Claims, 5 Drawing Figures

CHARACTER RECOGNITION EMPLOYING COMPRESSED IMAGE DATA

This invention relates to a method and an apparatus for character recognition and more specifically to a system for pre-processing of data that has been optically read by means of a video reader from a document.

The U.S. Pat. No. 3,699,536 shows an example of a character recognition apparatus in which data from an optical raster scanner is put into pre-processing circuits and further on into character recognition circuits.

IBM Technical Disclosure Bulletin, Vol. 15, No. 12, May 1973, pages 3849 and 3850, describes the use of compressed data in the form of a run length code for character and image recognition in connection with black and white document scanning.

When using an optical document reader as a terminal unit for reading checks or similar documents in banks or similar institutions, it is desirable to achieve a simple and cheap design. Optical document readers often need large memory areas and sophisticated circuits for processing the read video signals.

The present invention minimizes these memory and circuit requirements, employing a direct memory access device that controls the transfer of compressed video data to a memory and a microprocessor that controls the expansion of compressed video data and the character recognition by means of a scan start table.

One advantage of the invention is the saving of memory space.

The second advantage of the invention is the enhancement of the character recognition possibilities.

A further advantage of the invention is the recognition of easily recognizable characters by means of simple and rapid routines and the recognition of characters that are hard to recognize by means of further correcting routines whereby an optimized time saving is achieved.

Still another advantage of the invention resides in the fact that the ultimate character recognition, after the pre-processing, is performed in a fixed character area whereby no indirect addressing is needed.

The invention will now be described in detail in connection with the enclosed drawings, wherein.

Figure 1:
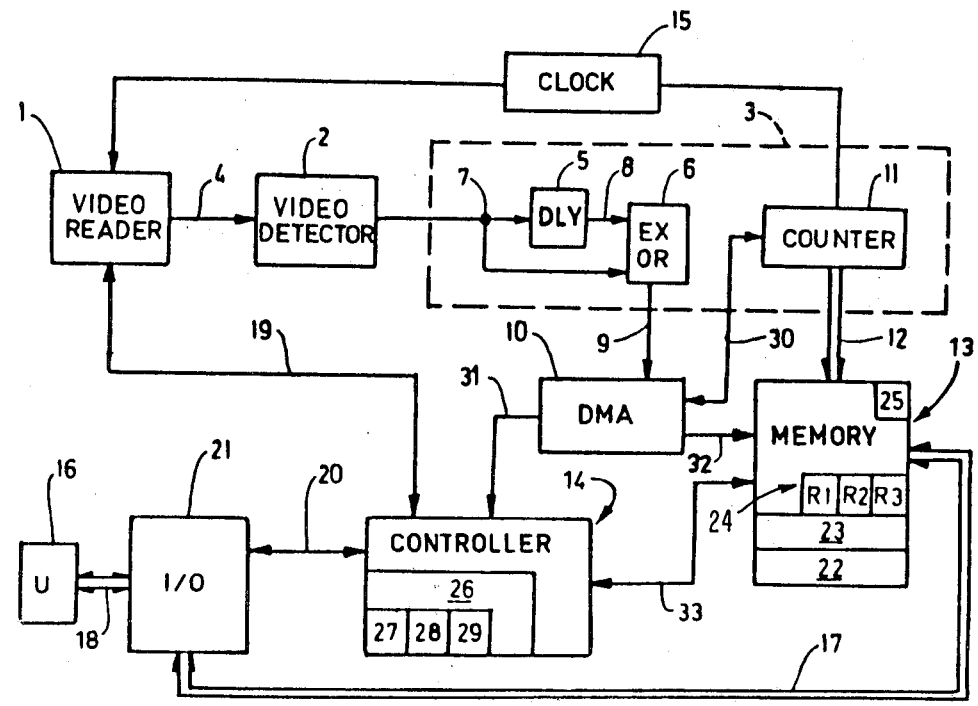
FIG. 1 is an organizational diagram showing a character recognition apparatus according to the invention.

Referring to FIG. 1, the video reader 1 is an optical raster scanner searching black and white areas on a moving document. This video reader is of conventional design, having preferably a light source that illuminates the document and a number of light diodes, preferably 64 light diodes, that scan the reflected light to produce an analog signal which is delivered via line 4 to a video detector 2 which produces a binary bit stream wherein the dark spots of a character are detected by the video detector 2 as 1-signals and the white spots as 0-signals. Such a video detector is described, for instance, in the U.S. Pat. No. 3,912,943. A clock control circuit 15 synchronizes the raster search scan with the document movement.

Figure 2:
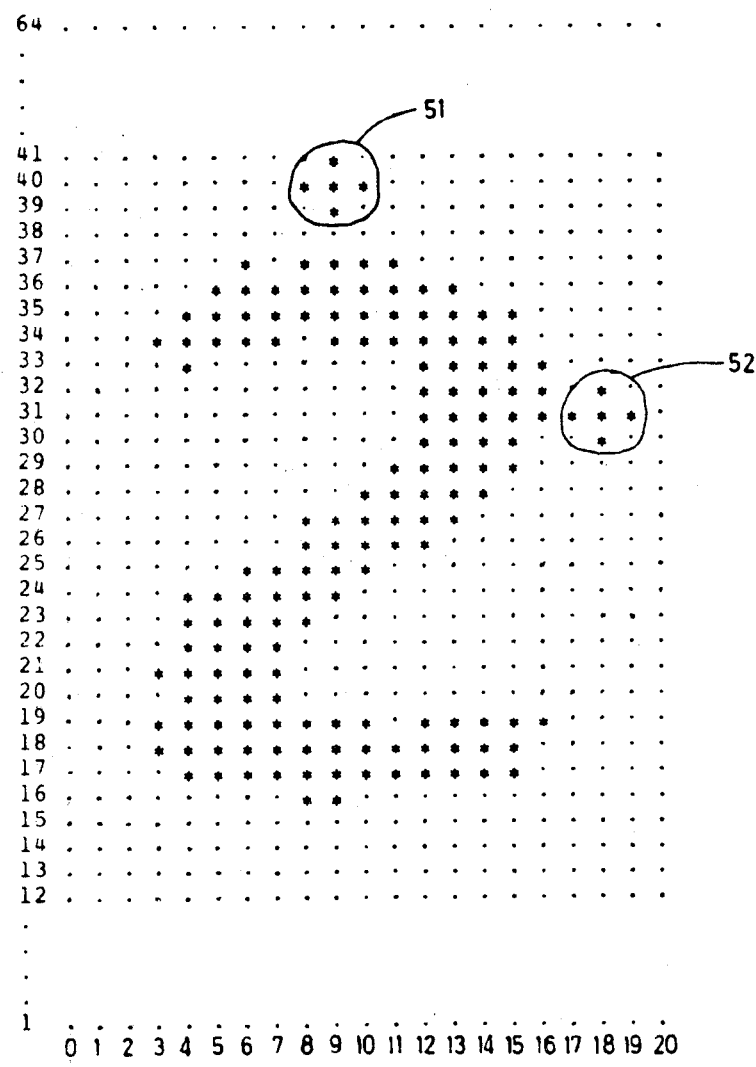
FIG. 2 is a diagram showing the raster search of a character.

FIG. 2 shows an example of the raster scanning output of the video reader 1 and detector 2 when a character "2" is to be scanned. The raster scanning proceeds column after column. The first scan searches column 1, where only white areas are found. The column 2 is then scanned, and only white areas are found. During the scanning of column 3, the light diodes corresponding to the rows 18, 19, 21 and 34 will deliver signals indicating black areas. All the other light diodes deliver white output signals when scanning column 3. When column 4 is scanned, the resulting output signals will indicate black between the rows 17 and 24, and between the rows 33 and 35. All other rows are indicating white. The scan will go on in the same way over the remaining columns 5–20. In this connection, the area 51 and 52 indicated black noise areas.

The digitalized 1- and 0-bit signals of this raster appear in series form at the output of the video detector 2 and are fed into an encoder circuit 3. The encoder circuit 3 translates the arriving bit signals into a run length code. This means that the arriving bit signals, indicating 0 for a white scan and 1 for a black scan, are transformed into a code that only indicates transitions from white to black and transitions from black to white. For example, in column 4 of FIG. 2, it is seen that a transition from black to white occurs at row 17; that a transition from white to black occurs at row 25; that a transition from black to white occurs at row 33; and that a transition from white to black occurs at row 36.

In the encoder 3, the arriving digital bits are transferred from the input terminal 7 to a 1-bit delay circuit 5 and at the same time to an EXCLUSIVE OR circuit 6. The output signal from the delay circuit 5 is transferred over a line 8 to the second input of the EXCLUSIVE OR circuit 6. The output 9 from the EXCLUSIVE OR circuit 6 will then deliver an output signal in connection with the transition from black to white and the transition from white to black. The output 9 from the EXCLUSIVE OR circuit 6 of the encoder 3 is connected to a direct memory access control unit (DMA) 10. The DMA unit 10 controls the transfer of data from the encoder 3 to a memory 13 through a control output 32.

The encoder 3 includes a counter 11 that is activated by a control signal from the clock circuit 15 at the beginning of every scan and that is stepped upwards one step for every row in FIG. 2. When an output signal appears on line 9 from the EXCLUSIVE OR circuit 6 to DMA circuit 10, this latter circuit will transfer the value of counter 11 on an output line 12 to a memory space 22 for compressed video data in memory 13.

A control unit 14 serves to control different functions in the process of character recognition. The control unit 14 is preferably a microprocessor. Through a control line 20, this processor controls an input/output unit 21, preferably an adapter unit, that is connected through a data channel 18 to a user device 16. The input/output unit 21 may also include a printing unit.

The microprocessor 14 further controls the recognition of characters in memory 13 through a control line 33, as well as the transmission of recognized characters through an output channel 17 to the input/output unit 21. The controller 14 also controls, via a control line 19, the document transport mechanism of the video reader 1.

The function of the encoder 3, the direct memory access unit 10, the memory 13, and the controller 14 will now be described in detail with reference to FIG. 2.

It is supposed that the counter 11 of the encoder 3 holds a value 0 when a scan is started for column 0 of FIG. 2. The counter 11 is activated by a scan start signal from the clock control circuit 15. Every row that the scan passes under column 0 will increment the counter 11 one step until a final value of 64 appears. At this event, scan start signal SS activates the DMA circuit 10 to initiate a memory cycle for transferring the counter value 64 from the counter 11 through the transfer channel 12 to the memory space 22 for compressed video data of memory 13. It is assumed that this data value 64 is stored in an address position 201 of the memory space 22. Thereafter, the counter 11 is reset and the scan of column 1 is initiated. The counter 11 will be incremented again for every row during column 1 and will finally arrive at the value 64 when scanning the row 64 for column 1. Again, a scan start signal appears that initiates another DMA-cycle for transfer of the data value 64 from the counter 11 to the memory space 22. This data value is stored in a memory address position 202 The counter 11 is reset and a new incrementing process begins for column 2, with the resulting value of 64 being stored at address position 203.

The scan of column 3 proceeds by incrementing the counter 11 until a dark point is found at row 18 when a "1" signal appears at the input of the encoder 3 instead of the "0" signals heretofore received. This "1" is also gated to one input of the EXCLUSIVE OR circuit 6 at the same time as the delay circuit 5 delivers a "0" on the output 8. The EXCLUSIVE OR circuit 6 then delivers a signal on output 9 to the DMA-circuit 10, whereby a DMA-memory cycle is initiated. A signal on the control line 31 to the controller 14 will stop the controller during one cycle. At the same time, the data transfer from the counter 11 to the memory 13 is controlled through control signals on control lines 30 and 32. The data value of 18 from the counter 11 is stored in the following address position of memory space 22, i.e., in the address position 204. The counter 11 is not reset and the scan proceeds to row 20, where a white point is found. The EXCLUSIVE OR circuit 6 now has different signal levels on its two inputs and initiates another DMA-cycle on its output 9. This time the counter value of 20 is transferred from the counter 11 to an address position 205 of the memory space 22. The next change of the video signal input takes place at row 21, when the video signal input turns dark from white. This means a new DMA-cycle, and the data value of 21 is stored in the address position 206 of memory space 22. At row 22, another change of the video signal value takes place, and the data value of 22 is stored in the address position 207 of the memory space 22 through a DMA-cycle. Thereafter, a video signal input change takes place at rows 34 and 35, which leads to a memory cycle for storing the data value of 34 in the address position 208 and of the data value of 35 in the address position 209 of the memory space 22. The scan is completed when row 64 is recorded, causing a data transfer from the counter 11, having data value of 64, to a memory address position 210 in the memory space 22 in the same way that has been described earlier, and initiating the subsequent scan.

In this way, the raster scans will go on for the rest of the columns in FIG. 2. The result of these scans is shown in the following Table 1. It should, however, be observed that the noise areas 51 and 52 of FIG. 2 have not been included in Table 1 to simplify understanding of the invention. The treatment of noise is described in connection with FIGS. 4 and 5.

TABLE 1

| START | ADDRESS | DATA | START | ADDRESS | DATA |
|---|---|---|---|---|---|
| SS1 | 201 | 64 | SS10 | 244 | 64 |
| SS2 | 202 | 64 | | 245 | 17 |
| SS3 | 203 | 64 | | 246 | 20 |
| | 204 | 18 | | 247 | 25 |
| | 205 | 20 | | 248 | 29 |
| | 206 | 21 | | 249 | 34 |
| | 207 | 22 | | 250 | 38 |
| | 208 | 34 | SS11 | 251 | 64 |
| | 209 | 35 | | 252 | 17 |
| SS4 | 210 | 64 | | 253 | 19 |
| | 211 | 17 | | 254 | 26 |
| | 212 | 25 | | 255 | 30 |
| | 213 | 33 | | 256 | 34 |
| | 214 | 36 | | 257 | 38 |
| SS5 | 215 | 64 | SS12 | 258 | 64 |
| | 216 | 17 | | 259 | 17 |
| | 217 | 25 | | 260 | 20 |
| | 218 | 34 | | 261 | 26 |
| | 219 | 37 | | 262 | 37 |
| SS6 | 220 | 64 | SS13 | 263 | 64 |
| | 221 | 17 | | 264 | 17 |
| | 222 | 26 | | 265 | 20 |
| | 223 | 34 | | 266 | 27 |
| | 224 | 38 | | 267 | 37 |
| SS7 | 225 | 64 | SS14 | 268 | 64 |
| | 226 | 17 | | 269 | 17 |
| | 227 | 26 | | 270 | 20 |
| | 228 | 34 | | 271 | 28 |
| | 229 | 37 | | 272 | 36 |
| SS8 | 230 | 64 | SS15 | 273 | 64 |
| | 231 | 16 | | 274 | 17 |
| | 232 | 20 | | 275 | 20 |
| | 233 | 23 | | 276 | 29 |
| | 234 | 28 | | 277 | 36 |
| | 235 | 35 | SS16 | 278 | 64 |
| | 236 | 38 | | 279 | 19 |
| SS9 | 237 | 64 | | 280 | 20 |
| | 238 | 16 | | 281 | 31 |
| | 239 | 20 | | 282 | 34 |
| | 240 | 24 | SS17 | 283 | 64 |
| | 241 | 28 | SS18 | 284 | 64 |
| | 242 | 34 | SS19 | 285 | 64 |
| | 243 | 38 | | | |

It appears from the above table that each scan begins with a scan start (SS) entry with a data value 64 representing the end of the previous scan. When the scans cross only white areas, the entries SS follow each other, which is illustrated in the table by the rows SS 1, SS 2, SS 17, SS 18 and SS 19. In the areas inbetween, where black spots are found, a number of entries will be stored between the SS rows.

It can be seen that the information of Table 1 shows the video information for the character 2 of FIG. 2, as stored in compressed form in the memory space 22 of memory 13.

According to what has been stated above, the memory transfer from the encoder 3 to the memory 13 takes place by means of a direct memory access method that is well known in the prior art. It is now up to the controller 14 to find a suitable way of using the compressed video data in the memory 13 in order to execute the real character recognition. In order to do this, the controller creates in the memory 13 a scan start (SS) table in a memory space 23. An example of this SS table that points to the video information in Table 1 is shown in Table 2 below.

TABLE 2

| SS-table | |
|---|---|
| ADDRESS | DATA |
| 501 | 201 |
| 502 | 202 B |
| 503 | 203 F |
| 504 | 210 |
| 505 | 215 |
| 506 | 220 |
| 507 | 225 |
| 508 | 230 |
| 509 | 237 |
| 510 | 244 |
| 511 | 251 |
| 512 | 258 |
| 513 | 263 |
| 514 | 268 |
| 515 | 273 |
| 516 | 278 |
| 517 | 283 F |
| 518 | 284 |
| 519 | 285 |

The SS table stores, in given address positions within memory space 23, the addresses of each SS row of the Table 1. Thus, the first address position 501 of the SS table contains a data value 201 which is the address of SS 1 in Table 1. The second address position 502 of the SS table points at SS row 2 of Table 1. The address position of 503 of the SS table contains the data value 203, as well as a flag bit F, resulting from the recognition that SS 3 forms a left border line between the white area and the dark area of FIG. 2. In the same way, address position 517 of Table 2 contains a flag bit F that points at the end of a dark area.

Figure 3:
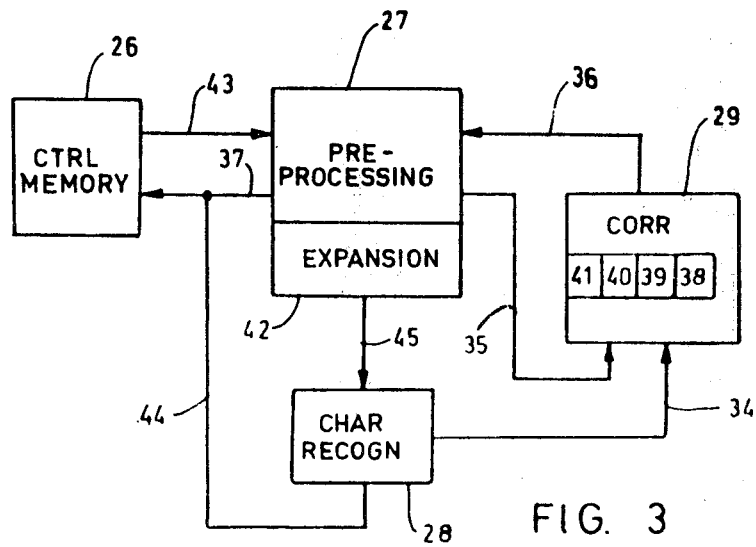
FIG. 3 is an expanded block diagram of a portion of the diagram of FIG. 1, showing how the character recognition apparatus is controlled according to the invention.

Referring to FIG. 1, the controller 14 includes a control memory, including blocks or units 26, 27, 28 and 29. One embodiment of the control memory is shown in FIG. 3. The various control units are preferably in the form of microprograms.

The block 26 of FIG. 3 represents a microprogram for the general control of the system. This control concerns the video reader 1, the input/output unit 21, the data transfer from the memory 13 to the input/output unit and the start of the character recognition. It should be observed in this connection, that the controller 14 and the DMA unit 10 are working asynchronously. The DMA unit works continuously with building up compressed video data from the encoder 3 to the memory area 22, according to the above Table 1. This data storing is accomplished in such a way that the DMA circuit momentarily stops the controller 14 for its own memory transfer. Asynchronously with this, the controller 14 enters memory 13, searches Table 1 and executes operations in order to recognize characters from these compressed video data.

From FIG. 3, it is seen that the control block 26 has one output 43 to the control unit 27 for preprocessing video data. This output is preferably the start of a subroutine for character recognition from the general control routine. The preprocessing in block 27 comprises preprocessing of the compressed video data that is stored in the area 22. If this preprocessing shows that a character recognition is not possible, the subroutine returns via output 37 from the control block 27 to the general control 26. If, instead, the preprocessing is successful, the compressed video data is expanded into normal video data in a control block 42. This expanded video data is stored in a specific area 25 of the memory 13. The output from the control block 42 is delivered via 45 to a character recognition control block 28. The character recognition of the expanded video data is performed in a conventional way, e.g., as is shown in U.S. Pat. No. 4,001,787, and the result is delivered through the output 44 to the general control memory block 26. If, however, the character recognition is not successful, an output 34 is activated for a correcting control routine 29, the output 36 of which transfers the operation to the preprocessing in the block 27. The preprocessing at 27 may also include an output 35 for correcting the preprocessing, which takes place in correcting block 29.

It has been shown above how the DMA unit builds compressed video data in the area 22 of memory 13 according to Table 1. When enough compressed video data has been stored in the memory 13, the controller 14 starts preprocessing this data according to the control program in the control block 27. This preprocessing includes setting up a frame around the video data that represents one character in the memory area 22.

The preprocessing starts with the establishment of the SS Table 2 in the memory area 23. This is done in such a way that the control block 27 searches, position after position, the memory area 22, looking for compressed video data, that is searching the Table 1. All the rows of Table 1 where the data value is 64 are transferred to Table 2. The control block or control program 27 is at the same time looking for transitions from all white scans to scans where dark areas are found. Such transitions from all white scans to mixed black/white scans and from mixed black/white scans to all white scans are indicated in the SS Table 2 with an indicator bit or a flag bit F. In this way, the preprocessing control program 27 records the lateral limits of the character. Then the control unit 27 calculates the lateral starting point for SS Table 2 and indicates this point with a frame marker B in Table 2. This calculation is based upon a constant character width, according to which the system is working for the character recognition. In the example of FIG. 2, this width has been chosen to be 16 scans. Thus, a character is located in that 16-scan region that starts in column 2 and ends in column 17. The frame marker B is thus put into the address position 502 in Table 2 of memory area 23.

At the same time as the location of the lateral limit, the control block 27 is also conducting a calculation of the upper and lower limits of the character. This is carried out in a minimum register R1 and a maximum register R2 in a register unit 24 of the memory 13. When the control block 27 searches the Table 1, the data value of 18 at the address 204 will first be entered in both the register R1 and the register R2. At the address 205, R2 is updated into value 20. At the address 206, R2 is updated into 21, and at address 207, into 22. Then an updating takes place in the maximum register at the address 208 into 34 and at 209 into 35. At 211, the minimum register R1 is updated into 17, and at 214 the maximum register R2 is updated into 36. Next updating of the maximum register takes place at the address 219 into value 37 and finally at address 224 into the maximum value 38. Thereafter, no updating is carried out until at the address 238, when the minimum register R1 is updated into the minimum value 16. Thereafter, no further updating takes place in connection with the preprocessing of the data in Table 1.

The control block 27 will calculate a value for the lower limit of the character field considering the minimum and maximum values of registers R1 and R2. This calculation is based upon a constant value of the distance between the minimum limit and the maximum limit. In the example according to FIG. 2, this distance is chosen to be 24 rows. The result of this calculation is a displacement value representing the distance the lower edge of the character is from the lower edge of the scan frame. This displacement value is stored in the register R3 of unit 24. According to the example of FIG. 2, the value 14 is stored in register R3.

When the preprocessing procedure, according to the control program of the unit 27, is carried out, the control turns to the expansion procedure 42. Hereby the character data which has been framed through frame marker B and the displacement stored in R3 will be transferred from the memory area 22 in expanded form to a memory area 25. The memory area 25 contains 16×24 memory positions arranged in 48 bytes. The Table 3 below shows the expansion memory area 25, based upon the example of FIG. 2.

TABLE 3

| Row position | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 |
|---|---|---|---|---|---|---|---|---|---|---|---|---|---|---|---|---|---|---|---|---|---|---|---|---|
| Bit position | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| | Word address 1 | | | | | | | | | | | | | | | | | | | | | | | |
| Scan 2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Scan 3 | 0 | 0 | 0 | 1 | 1 | 0 | 1 | 0 | 0 | 0 | 0 | 0 | 0 | 0 | 0 | 0 | 0 | 0 | 1 | 0 | 0 | 0 | 0 | 0 |
| Scan 4 | 0 | 0 | 1 | 1 | 1 | 1 | 1 | 1 | 1 | 1 | 0 | 0 | 0 | 0 | 0 | 0 | 0 | 1 | 1 | 1 | 0 | 0 | 0 | 0 |
| Scan 5 | 0 | 0 | 1 | 1 | 1 | 1 | 1 | 1 | 1 | 1 | 0 | 0 | 0 | 0 | 0 | 0 | 0 | 0 | 1 | 1 | 1 | 0 | 0 | 0 |
| . | | | | | | | | | | | | | | | | | | | | | | | | |
| Scan 16 | 0 | 0 | 0 | 0 | 1 | 0 | 0 | 0 | 0 | 0 | 0 | 0 | 0 | 0 | 0 | 0 | 1 | 1 | 1 | 0 | 0 | 0 | 0 | 0 |
| Scan 17 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | | | | | | | | | | | | | | | | | | | | Word address 48 | | | | |

From Table 3, it is seen that the memory area 25 begins with a byte of eight bits which are stored in a word address 1. The first three bytes consist of only zeroes and correspond to the scan at column 2 in FIG. 2 that only consists of white data information. The second row corresponds to scan 3, and its data is received from Table 1 starting from address 204. When the displacement value of register R3 is 14, the control unit 42 calculates the difference between the data value at address 204, which is 18, and the lower limit value of 14. The control unit 42 then controls the entrance of zeroes into the three first bit positions for scan 3 and a one in the fourth bit position. Then an access is carried out to address 205 in Table 1, where the displacement value 14 is subtracted from the new data value 20. The result 6 indicates that a zero has to be entered into the sixth bit position in scan 3 and a one in the fifth bit position. Next access concerns address 206, whereafter the subtraction gives the value 7 which means that a one is to be placed in bit position 7. Thereafter, an access is carried out for address 207 where subtraction of the data value 22 and the displacement 14 give the value 8. A zero is then entered into the bit position 8 for the scan 3. Then the expansion goes on for the compressed video data values in Table 1 into the data values that are shown in Table 3.

When all compressed data for a framed character area has been expanded and put into the memory area 25, the control is transferred from block 42 via 45 to the character recognition control 28. This character recognition control or control program is of conventional design and is no specific part of the present invention. Preferably, the character data of Table 3 in the memory area 25 is compared to various mask data for character recognition. When a character has been recognized by the control unit 28, the control is transferred through the distribution line 44 to the general control 26. The general control 26 will then initiate a character transfer from the memory 13 through the transmission channel 17 to the input/output unit 21. It should be observed, however, that despite the fact that the character recognition routine per se is well known, the present invention presents an advantage in that the address of the various words in Table 3 of the memory area 25 is always constant, whereby no indirect addressing is necessary in the character recognition routine itself. Such an indirect addressing is commonly used in earlier systems where character data is stored as a long string in a video buffer, and where the character recognizing control unit attains access to various character data by first defining where in the string the current character is positioned.

If the character recognition block 28 does not succeed in identifying a character, a correcting routine may be initiated by the transfer 34 to the correcting control block 29. After the correcting routine 29, the control may be transferred through 36 to the preprocessing 27, thereafter through expansion 42 and back to character recognition 28.

The correcting control unit 29 comprises a number of subcorrecting control units 38, 39, 40 and 41. These control units carry out correcting operations or control operations in order to improve the preprocessing in the control block 27 before the character recognition.

It is often difficult to find the correct vertical limits of the character area that is the correct position of the frame marked B in SS Table 2. The control unit 39 is responsive for shifting the position of frame marker B upwards or downwards in SS Table 2. The reason why frame marker B ends up in a wrong position in SS Table 2 may be dark noise, which is shown by the area 52 of FIG. 2. A successful change of the frame marker position may then result in a corrected preprocessing.

The control unit 40 is responsive for correcting a wrong displacement value, that is the contents of the displacement register R3. A wrong displacement value may be caused by a noise area 51, shown in FIG. 2. A successful change of the displacement value may correct the data values in the expanded area 25, i.e., in Table 3, whereafter character recognition may be possible.

A method of controlling a character area consists of adding all the dark spots of the area. If the sum of this adding then corresponds to a reference value for normal characters, it can be assumed that the character area is correctly chosen. Otherwise, if this sum differs obviously from the reference value of the character area, this is an indication of an erroneous character area. Such an addition is controlled by the control unit 38. This control unit examines the data values of Table 1 by subtracting them, pair by pair, from each other. Thus, the data value of address 204 is first subtracted from the data value of address 205, giving the digit 2 (20−18=2). Thereafter, the value 206 is subtracted from 207, giving the digit 1, and the value 208 from the value 209, giving also the digit 1. After that, the results are added, which indicates that the sum of the dark spots of scan 3 is 4. Then the sum of the dark spots of scan 4 is calculated, which is a sum of 11. In the same way, all other scans of Table 1 are added. Thanks to the compressed form of the video data, this control is very simple to carry out.

It is also possible to add data for dark areas regarding certain parts of an area, for example, in order to examine the separations between certain characters.

The control unit 41 is arranged to check and to modify the result of the preprocessing through a statistic comparison. If, for instance, the displacement value for a character suddenly changes in comparison to the characters earlier scanned, this can be an indication that the displacement value is erroneous. Other statistic information, as well, can be used in order to make corrections.

A great problem in connection with optical character recognition is to find the correct limits between different characters if, for instance, dark noise areas are connecting the character strings. This is shown in FIG. 4 and FIG. 5.

Figure 4:
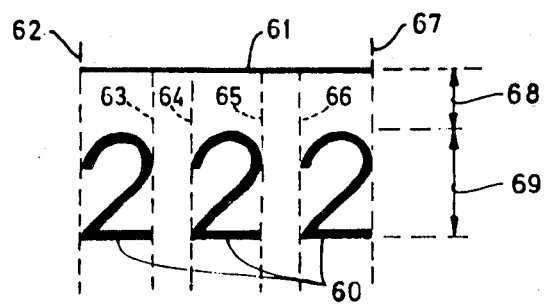
FIG. 4 shows a character area on a document, the characters of which are recognizable according to the invention.

From FIG. 4, it is seen that a noise area 61 in the form of a line exists above three 2-characters 60. The first SS table that is established will then contain flag bits F at the border lines 62 and 67, no flag bits at borders 63–66 and a frame marker B next to scan 62. This means that the separation between the flag bits at 62 and 67 in this SS table will be about 80 scans if we presume 20 scans per character and 10 scans per separation. According to FIG. 3, the preprocessing then turns from control block 27 through 35 to a correcting routing in the control block 29. The correcting is carried out by the control unit 41 for the statistical comparison finding out that the area 68 with the noise line 61 exists outside the statistical probable area 69. The control returns through 36 to the control block 27 in order to establish another SS table considering the correction. This new SS table will contain flag bits F at the scans 62, 63, 64, 65, 66, 67 and frame markers B next to scans 62, 64 and 66.

The displacement value will also be updated in connection with the establishment of the corrected new SS table. At this updating, data within the area 68 will be omitted, which will result in three new displacement values, one for every character 60. All three 2-characters in FIG. 4 are now well framed within well defined frames through frame markers B and displacement values in R3. The control can now turn to the expansion phase of control block 42.

Figure 5:
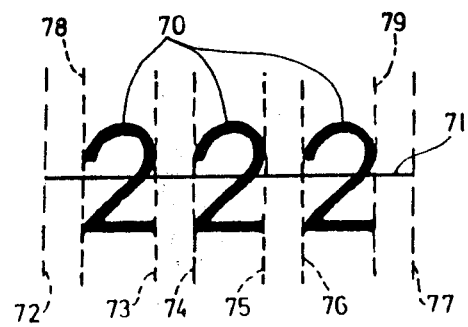
FIG. 5 shows a character area, the characters of which are recognizable under certain circumstances.

It is seen from FIG. 5 that the noise area 71 crosses all characters 70. This is often a difficult case for the system to recognize. During the first preprocessing, when establishing the SS table, only two flag bits F will appear in the scans 72 and 77. Then correcting is carried out in control block 29, preferably with the aid of control units 38 and 39, with the result that certain areas between the characters 70 are handled as separations between characters. The new flag bits F in the SS table are entered in the scan 78, 73, 74, 75, 76 and 79, as well as the frame markers B next to 78, 74 and 76. If the system in this way succeeds in framing the characters 70, it is possible that the character recognition control block 28 can recognize the individual characters if the noise line 71 is thin or faint.

An important portion of the invention idea comprises the possibility to carry out a first coarse preprocessing in the control block 27 in order to frame a character in a frame for recognition and then carry out expansion in block 42 as well as character recognition in block 28. Under normal conditions, this should result in recognizing more than 90% of the characters. Through the feedback loop 34, 29, 36 of FIG. 3, it is then possible to adjust the framing more exactly in order to recognize, if possible, also the remaining 10% of the characters. This method saves system time and capacity.

1. The method for processing video data in an optical character recognition system comprising raster scanning of a document to produce video data divided into individual scans, compressing said video data into a run-length code, storing said compressed video data, creating a first table comprising address information identifying individual scans of said stored compressed video data, expanding selected portions of said compressed video data, and processing the pattern thus expanded for character recognition.

2. The method of claim 1, wherein the creation of said first table comprises the establishment of a frame of constant width through storage of a frame marker therein, which marker defines the vertical position of the frame; further comprising the step of stores displacement value defining the lower limit of the frame, and selecting portions of said compressed video date by reference to said frame marker and to said displacement value.

3. Method according to claim 1, wherein the creation of said first table comprises scanning the data in the compressed memory area, storing in said table those position addresses that indicate a start of scan and storing flag bits in association with those addresses when all white scans are followed by scans of black and white information and vice versa.

4. Method according to claim 2, including the step of shifted said frame marker and/or said displacement value after an unsuccessful character recognition operation, whereafter another expansion operation and character recognition operation is performed by means of the new corrected frame.

5. Method according to claim 4, wherein said correction of the frame is based on statistical experience information and/or upon calculating the amount of black information.

6. Method according to claim 5, wherein the calculation of the amount of black information is performed by subtracting successive entries of said compressed video data and successively adding the results of the subtraction.

7. Character recognition apparatus comprising an optical document reader, a video detector for digital detection of video data, a memory for storing video data, a control unit for recognition of characters from stored video data and an output channel for transferring recognized characters from the memory to a user unit wherein the improvement comprises an encoder for coding detected video data into a compressed code, means for transferring compressed video data from the encoder into a first memory area for storing the video data in compressed form, a second memory area for storing table data defining a frame around a character sub-area in said first memory area, a third memory area for storing video data in expanded form, whereby the control unit controls setting up table data in the second memory area, expanding compressed video data from the first memory area and recognition of a character from expanded video data in the third memory area.

8. Character recognition apparatus according to claim 7, wherein the encoder includes a one-bit delay circuit, the input of which is connected to the output of the video detector, an EXCLUSIVE OR circuit, one input of which is connected to the output of the delay circuit, the second input of which is connected to the output of the video detector and the output of which is connected to the data transferring means, and a counter that is connected to a clock circuit and that is stepped upwards synchronously with the detection by the video detector of the digital data bits and the output of which is connected to the memory.

9. Character recognition apparatus according to claim 7, wherein said means for transferring compressed video data to said memory comprises a direct memory access unit that operates asynchronously with said control unit.

* * * * *